(12) United States Patent
Moore et al.

(10) Patent No.: US 10,970,578 B2
(45) Date of Patent: Apr. 6, 2021

(54) SYSTEM AND METHOD FOR EXTRACTING INFORMATION FROM A NON-PLANAR SURFACE

(71) Applicant: JOHNSON CONTROLS FIRE PROTECTION LP, Boca Raton, FL (US)

(72) Inventors: Liam Moore, Carrigaline (IE); Ana Vinogradova, Cork (IE); Volodymyr Korolyov, Cork (IE)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 136 days.

(21) Appl. No.: 16/270,432

(22) Filed: Feb. 7, 2019

(65) Prior Publication Data

US 2020/0257917 A1   Aug. 13, 2020

(51) Int. Cl.

| | |
|---|---|
| *G06K 9/00* | (2006.01) |
| *G06K 9/32* | (2006.01) |
| *G06K 9/62* | (2006.01) |
| *G06K 9/22* | (2006.01) |
| *H04N 7/18* | (2006.01) |
| *G06T 3/40* | (2006.01) |
| *G06F 40/186* | (2020.01) |

(52) U.S. Cl.
CPC .......... *G06K 9/325* (2013.01); *G06F 40/186* (2020.01); *G06K 9/228* (2013.01); *G06K 9/6202* (2013.01); *G06T 3/4038* (2013.01); *H04N 7/181* (2013.01); *H04N 7/188* (2013.01); *G06K 2209/01* (2013.01)

(58) Field of Classification Search
CPC ............ G06K 9/00–82; G06K 2209/01; G06F 40/186; G06T 3/4038; H04N 7/181; H04N 7/188
See application file for complete search history.

(56) References Cited

U.S. PATENT DOCUMENTS 8,712,163 B1 *  4/2014  Osheroff ............ G06K 9/00577
                                                                382/195
9,292,739 B1 *  3/2016  Gray ...................... G06K 9/033
(Continued)

OTHER PUBLICATIONS

Mehta et al. "Image stitching techniques", 2011, In: S.J Pise (eds) Thinkquest~2010. Springer, New Delhi. URL: https://link.springer.com/chapter/10.1007/978-81-8489-989-4_13?_sm_au_=iVV2LMkFkd4SqQ4s. Accessed on Feb. 6, 2019.

*Primary Examiner* — Sean T Motsinger
(74) *Attorney, Agent, or Firm* — Arent Fox LLP

(57) ABSTRACT

A system receives images capturing a non-planar surface from different respective angles, where each of the images captures a section of an area on the non-planar surface, the area including textual or graphical information. The system stitches together the images to obtain a stitched image that captures an entirety of the area on the non-planar surface. The system processes the stitched image to extract the textual or graphical information from the area on the non-planar surface. The system then associates the extracted textual or graphical information with one or more information fields in a report template, and generates a report by populating the one or more information fields of the report template with corresponding associated information within the extracted textual or graphical information.

22 Claims, 8 Drawing Sheets

(56) References Cited

U.S. PATENT DOCUMENTS

| | | | |
|---|---|---|---|
| 9,747,504 B2* | 8/2017 | Ma | H04N 5/145 |
| 10,438,036 B1* | 10/2019 | Reome | G06K 7/10544 |
| 2004/0186747 A1* | 9/2004 | Nakano | G06Q 50/22 |
| | | | 705/3 |
| 2005/0231354 A1* | 10/2005 | Riedel | G08B 25/006 |
| | | | 340/531 |
| 2007/0257934 A1* | 11/2007 | Doermann | G06K 9/36 |
| | | | 345/606 |
| 2009/0016606 A1* | 1/2009 | Meyer | G06T 5/006 |
| | | | 382/176 |
| 2011/0063468 A1* | 3/2011 | Ahn | G06K 9/3258 |
| | | | 348/222.1 |
| 2011/0102861 A1* | 5/2011 | Nuttall | H04N 1/0083 |
| | | | 358/474 |
| 2012/0134588 A1* | 5/2012 | Zhang | G06K 9/3275 |
| | | | 382/176 |
| 2012/0330665 A1* | 12/2012 | Berkun | G06K 9/00449 |
| | | | 704/260 |
| 2013/0070068 A1* | 3/2013 | Garvey | G01C 15/00 |
| | | | 348/61 |
| 2013/0113827 A1* | 5/2013 | Forutanpour | G06T 11/00 |
| | | | 345/633 |
| 2013/0208084 A1* | 8/2013 | Brunner | G06T 11/60 |
| | | | 348/36 |
| 2013/0223673 A1* | 8/2013 | Davis | G06Q 30/00 |
| | | | 382/100 |
| 2013/0242054 A1* | 9/2013 | Chiu | H04N 13/10 |
| | | | 348/46 |
| 2014/0055826 A1* | 2/2014 | Hinski | H04N 1/3876 |
| | | | 358/473 |
| 2014/0188502 A1* | 7/2014 | Defrank | G06F 19/3462 |
| | | | 705/2 |
| 2014/0281871 A1* | 9/2014 | Brunner | G06K 9/00483 |
| | | | 715/226 |
| 2015/0227804 A1* | 8/2015 | Kobayashi | G06K 9/209 |
| | | | 382/142 |
| 2015/0286888 A1* | 10/2015 | Maison | G06K 9/3258 |
| | | | 382/182 |
| 2016/0037135 A1* | 2/2016 | McSheffrey | G06K 9/00771 |
| | | | 348/143 |
| 2016/0180467 A1* | 6/2016 | Griffin | G06Q 40/08 |
| | | | 705/4 |
| 2017/0024629 A1* | 1/2017 | Thrasher | G06T 7/11 |
| 2017/0068798 A1* | 3/2017 | Akinwale | G06F 19/3456 |
| 2017/0124416 A1* | 5/2017 | Shi | G06T 7/30 |
| 2017/0124424 A1* | 5/2017 | Takahashi | G06K 9/00664 |
| 2017/0154027 A1* | 6/2017 | Guzman | G06F 16/248 |
| 2017/0212910 A1* | 7/2017 | Morris | G06T 7/70 |
| 2017/0249491 A1* | 8/2017 | MacIntosh | G06K 7/10861 |
| 2017/0300926 A1* | 10/2017 | Stout | G06F 16/51 |
| 2018/0322110 A1* | 11/2018 | Rhodes | G06F 40/186 |
| 2019/0141253 A1* | 5/2019 | Sakashita | H04N 5/23203 |
| 2019/0149725 A1* | 5/2019 | Adato | H04N 1/32144 |
| | | | 348/158 |
| 2019/0243841 A1* | 8/2019 | Hoffmann | G06F 40/186 |

* cited by examiner

SYSTEM AND METHOD FOR EXTRACTING INFORMATION FROM A NON-PLANAR SURFACE

BACKGROUND

The present disclosure relates generally to data extraction systems and methods, and more particularly to systems and methods of extracting information from a non-planar surface.

Stand-alone fire extinguishers are commonly installed across building environments to provide a scalable, upgradeable, and flexible fire safety/suppression solution that requires minimal infrastructural changes. Routine regulatory, safety, and/or maintenance inspection of a fire extinguisher commonly involves a qualified service engineer manually reading the fire extinguisher label, identifying key information such as suppressant type, latest date of inspection, pressure reading, etc., and digitally recording such information to generate a report. However, routine inspection of fire extinguishers may incur a large, recurring cost. In particular, due to the large number of fire extinguishers required to sufficiently protect a large area, management of fire extinguishers in large buildings may be an expensive and time-consuming task. In addition to being costly and time-consuming, the possibility of human error may also lead to erroneous readings. Thus, improvements are desired in fire safety systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for extracting information from areas on non-planar surfaces, where the area cannot be captured in a single image of the non-planar surface. In an aspect, for example, the non-planar surface may be the curved surface of a cylindrical vessel such as a fire extinguisher, in which case the area may correspond to a label and the extracted information may be used to generate an inspection report of the fire extinguisher.

In an aspect, a method of extracting data from an image includes receiving images capturing a non-planar surface from different respective angles, where each of the images captures a section of an area on the non-planar surface, the area including textual or graphical information. The method may further include stitching together the images to obtain a stitched image that captures an entirety of the area on the non-planar surface. The method may further include processing the stitched image to extract the textual or graphical information from the area on the non-planar surface. The method may further include associating the extracted textual or graphical information with one or more information fields in a report template. The method may further include generating a report by populating the one or more information fields of the report template with corresponding associated information within the extracted textual or graphical information.

In another aspect, an apparatus includes a processor and a memory storing instructions that when executed by the processor cause the processor to receive images capturing a non-planar surface from different respective angles, where each of the images captures a section of an area on the non-planar surface, the area including textual or graphical information. The instructions when executed by the processor further cause the processor to stitch together the images to obtain a stitched image that captures an entirety of the area on the non-planar surface. The instructions when executed by the processor further cause the processor to process the stitched image to extract the textual or graphical information from the area on the non-planar surface. The instructions when executed by the processor further cause the processor to associate the extracted textual or graphical information with one or more information fields in a report template. The instructions when executed by the processor further cause the processor to generate a report by populating the one or more information fields of the report template with corresponding associated information within the extracted textual or graphical information.

In a further aspect, a method of extracting data from an image includes receiving images capturing a non-planar surface from different respective angles, where each of the images captures a section of an area on the non-planar surface, the area including textual or graphical information. The method may further include stitching together the images to obtain a stitched image that captures an entirety of the area on the non-planar surface. The method may further include processing the stitched image to extract the textual or graphical information from the area on the non-planar surface. The method may further include sending the extracted visual information to a second device.

In yet another aspect, a first device includes a processor and a memory storing instructions that when executed by the processor cause the processor to receive images capturing a non-planar surface from different respective angles, where each of the images captures a section of an area on the non-planar surface, the area including textual or graphical information. The instructions when executed by the processor further cause the processor to stitch together the images to obtain a stitched image that captures an entirety of the area on the non-planar surface. The instructions when executed by the processor further cause the processor to process the stitched image to extract the textual or graphical information from the area on the non-planar surface. The instructions when executed by the processor further cause the processor to send the extracted visual information to a second device.

In a further aspect, a method of extracting data from an image includes receiving, by a first device, a stitched image from a second device, the stitched image capturing an entirety of an area on a non-planar surface, the stitched image being based on images capturing a non-planar surface from different respective angles, where each of the images captures a section of an area on the non-planar surface, the area including textual or graphical information. The method further includes processing the stitched image to extract the textual or graphical information from the area on the non-planar surface. The method further includes associating the extracted textual or graphical information with one or more information fields in a report template. The method further includes generating a report by populating the one or more information fields of the report template with corresponding associated information within the extracted textual or graphical information.

In yet a further aspect, a first device includes a processor and a memory storing instructions that when executed by the processor cause the processor to receive a stitched image from a second device, the stitched image capturing an entirety of an area on a non-planar surface, the stitched image being based on images capturing a non-planar surface from different respective angles, where each of the images captures a section of an area on the non-planar surface, the area including textual or graphical information. The instructions when executed by the processor further cause the processor to process the stitched image to extract the textual or graphical information from the area on the non-planar surface. The instructions when executed by the processor further cause the processor to associate the extracted textual or graphical information with one or more information fields in a report template. The instructions when executed by the processor further cause the processor to generate a report by populating the one or more information fields of the report template with corresponding associated information within the extracted textual or graphical information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
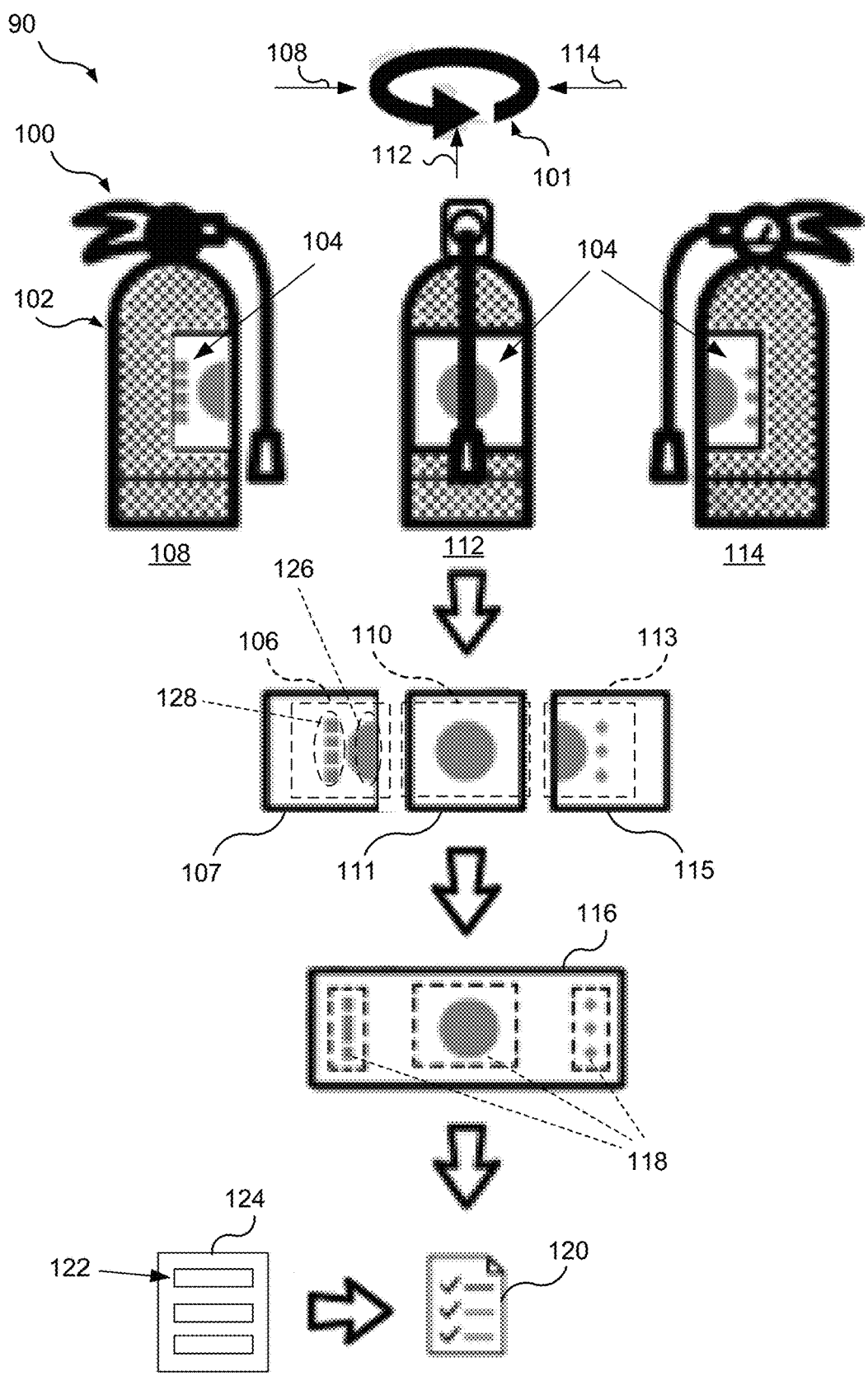
FIG. 1 is a schematic diagram of example image capturing perspectives, image stitching, data extraction, and automatic report data population of an example data extraction and inspection report generation functionality, such as for inspecting a label on a non-planar surface of an object, e.g., a cylindrical fire extinguisher, where the label may not be fully and/or clearly visible from a single camera viewing angle.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide methods and systems for extracting graphical, textual, and/or other visual information printed on non-planar surfaces or included in a label attached to non-planar surfaces from a plurality of images that cover different sections of an area on the non-planar surface that includes the visual information. In an aspect, for example, a novel stitching and information extraction functionality is applied to a number of images of different sections of a label attached/imprinted across a surface of a cylindrical or other non-planar-shaped vessel to automatically identify/read information from the label. In one non-limiting aspect, a camera of a portable computing device, such as a mobile phone or another handheld device, may be moved to different radial positions relative to an area to capture the images from a label attached/imprinted across the area on a non-planar surface of a vessel, such as but not limited to a fire extinguisher. In another aspect, the images may be captured by two or more security cameras with respective different fields of view that each capture at least a portion of the vessel, e.g., the security cameras are positioned or positionable at different radial angles relative to the area on the non-planar surface that includes the visual information. In an aspect, for example, the inspection-relevant information extracted from the label of a fire extinguisher may include attributes such as a manufacturer/brand name, model, serial number, date of manufacture, list of inspection dates or date of last inspection, color-coded identifier of the fire extinguishing material, fire extinguisher classification of type of fire the fire extinguisher can extinguish (e.g., Class A, B, C, D, or K), a numerical rating of relative extinguishing effectiveness (e.g., Underwriter Laboratory (UL) ratings of Class A, Class B:C, Class C, such as "5A;15B:C"), and/or graphical and/or graphical/textual information, such as an icon or pictograph or colored shape, identifying the types of fires that can be extinguished, etc.

By automatically reading/extracting graphical and textual information from a stitched image generated from multiple images each including a different section of a label attached/imprinted on a non-planar surface that cannot be captured in a single image, the present aspects allow for accurate, fast, and automated inspection of such surfaces as compared to conventional manual inspection methods.

Turning now to the figures, example aspects are depicted with reference to one or more components described herein, where components in dashed lines may be optional.

Referring to FIG. 1, in one non-limiting aspect, a system 90 is configured to obtain multiple images of an area including a label on a non-planar surface of an object 100, stitch together a number of the images, extract textual and/or graphical information from the label, and populate designated field of a report with the extracted data. Specifically, the object 100, such as a cylindrical fire extinguisher (or any other vessel or object with a non-planar surface), may include a non-planar surface 102 and a label 104 imprinted on or attached to the non-planar surface 102. In some cases, only a portion of the label 104, and not the entire label 104, is clearly or fully visible when the object 100 is viewed by a camera from any single angle. As such, the entire label 104 may not be captured by the camera in a single image frame. However, the camera may capture various portions or sections of the label 104 that collectively define the entire label 104, e.g., when the object 100 is viewed from multiple angles in a rotational direction 101 around the object 100. For instance, the rotational direction 101 may be a direction that follows the non-planar surface 102.

For example, a left portion 106 of the label 104 may be visible when the object 100 is viewed from a first angle 108, a middle portion 110 of the label 104 may be visible when the object is viewed from a second angle 112, and a right portion 113 of the label 104 may be visible when the object 100 is viewed from a third angle 114. The left portion 106, the middle portion 110, and the right portion 113 may contain overlapping sections of the label 104, and thus may collectively represent the entire label 104. Accordingly, although the entire label 104 may not be captured in a single image, a first image 107 may be captured from the first angle 108 to include the left portion 106 of the label 104, a second image 111 may be captured from the second angle 112 to include the middle portion 110 of the label 104, and a third image 115 may be captured from the third angle 114 to include the right portion 113 of the label 104. Then, the first image 107, the second image 111, and the third image 115 may be combined/stitched together to obtain a stitched image 116 that captures the entire label 104. It should be understood that the described first image 107, second image 111, and third image 115 is one example, and any number of two or more images may be combined or stitched together to form the stitched image 116, for example, based on one or more factors such as differences in the content of each image, available processing resources, available processing time, or other similar factors that can extend or shorten a time of analyzing and stitching together related images.

In some aspects, features/patterns such as graphical or textual information on the label 104, borders of the label 104, etc., may be identified in the first image 107, the second image 111, and/or the third image 115. Then, feature matching may be performed to identify corresponding features/patterns in adjacent images, and the corresponding features/patterns in adjacent images may be used to stitch together the first image 107, the second image 111, and the third image 115 to form a full image, i.e., the stitched image 116.

In some aspects, for instance, low quality portions in the first image 107, the second image 111, and the third image 115 may be identified and removed/cropped before stitching together the first image 107, the second image 111, and the third image 115. For example, in an aspect, a first portion 126 of the label 104 that is along a side of the non-planar surface 102 in the first image 107 may be distorted due to the curvature of the non-planar surface 102. Therefore, the first portion 126 of the label 104 in the first image 107 may have low image quality that is unsuitable for subsequent character and/or pattern recognition. However, other portions such as a second portion 128 of the label 104 that is in the middle of the non-planar surface 102 in the first image 107 may be undistorted and may therefore have good image quality that is suitable for subsequent character and/or pattern recognition. Accordingly, low quality portions of the first image 107, the second image 111, and the third image 115, such as the first portion 126 in the first image 107, may be detected and discarded before stitching the first image 107, the second image 111, and the third image 115 together.

Subsequent to the stitching, various label information 118 in different areas of the label 104 may be extracted from the stitched image 116 and used for creating an inspection report 120 associated with the object 100. Suitable examples of the label information 118 may include one or any combination of textual information and graphical information, such as but not limited to a manufacturer/brand name, model, serial number, date of manufacture, list of inspection dates or date of last inspection, color-coded identifier of the fire extinguishing material, fire extinguisher classification of type of fire the fire extinguisher can extinguish (e.g., Class A, B, C, D, or K), a numerical rating of relative extinguishing effectiveness (e.g., Underwriter Laboratory (UL) ratings of Class A, Class B:C, Class C, such as "5A;15B:C"), and/or an icon or pictograph or colored shape identifying the types of fires that can be extinguished, etc. For example, in an aspect, each of the extracted label information 118 may be associated with a respective field among various information fields 122 of a report template 124, and the information fields 122 may then be populated with corresponding associated label information 118 to generate the inspection report 120 of the object 100.

Figure 2:
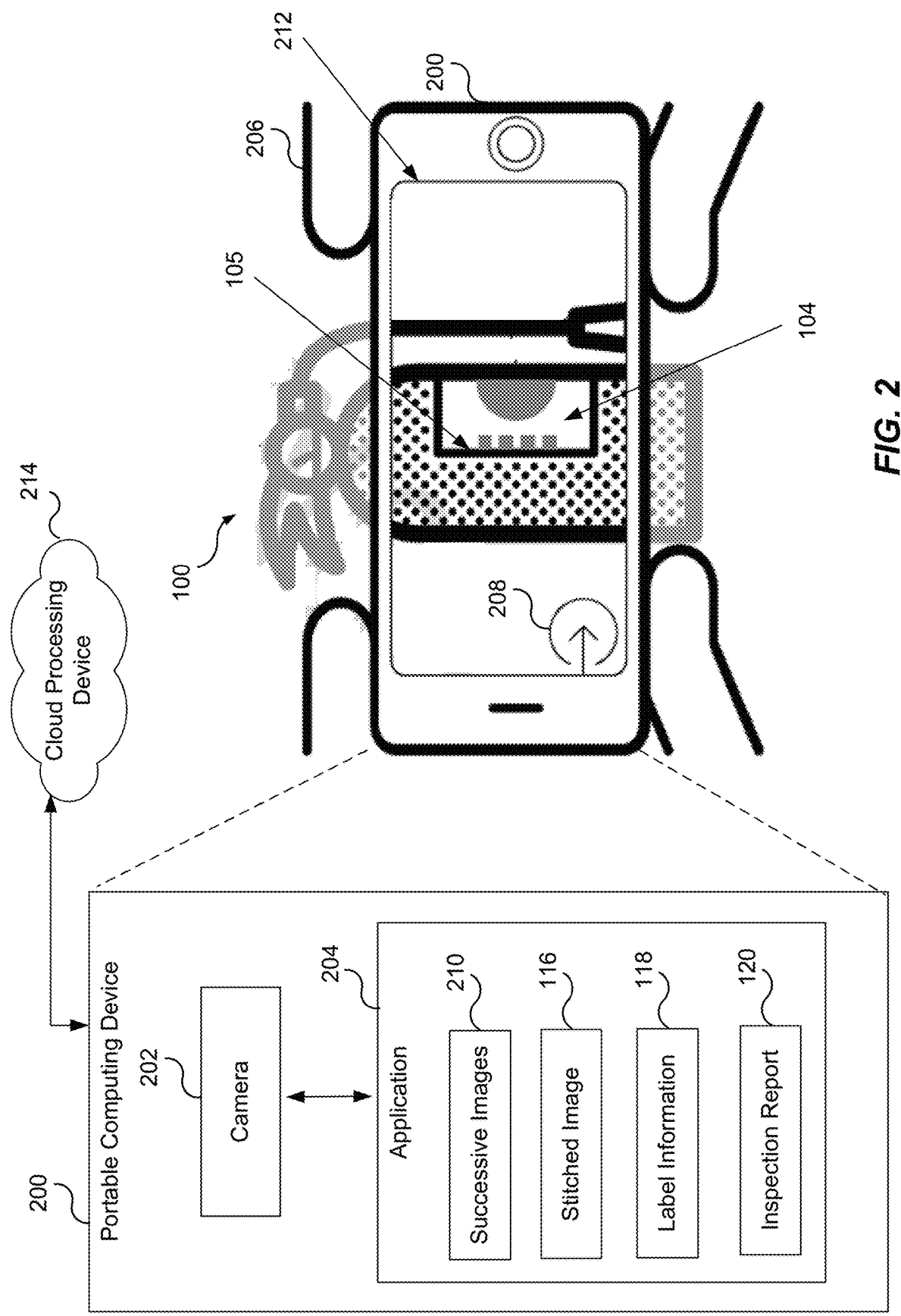
FIG. 2 is a schematic diagram of an example system that implements the example data extraction and inspection report generation functionality of FIG. 1.

Referring now to both FIGS. 1 and 2, in one example aspect, at least some of the aforementioned functionality may be deployed as an application 204 on a smartphone or other portable computing device 200 that includes a camera 202. For example, in an aspect, a user 206 may provide a user input, via pressing a graphical user interface (GUI) element such as an on-screen start button 208 on a display 212 of the portable computing device 200, or any other similar functionality, to start the application 204 and begin the image data collection process. The user 206 may then move the portable computing device 200 around the object 100 to capture successive images 210 of the object 100. In an aspect, for instance, the successive images 210 may be in the form of a plurality of image frames of a video, where each of the image frames is captured at a set frame rate (e.g., 20 images per second). Alternatively, the successive images 210 may be in the form of a series of still images, e.g., photographs, captured at regular or irregular intervals as the camera 202 is moved around the object 100. For example, as described above with reference to FIG. 1, the successive images 210 may include the first image 107 that includes the left portion 106 of the label 104, the second image 111 that includes the middle portion 110 of the label 104, and the third image 115 that includes the right portion 113 of the label 104.

In an aspect, for example, as the user 206 moves their smartphone or other portable computing device 200 around the object 100, the application 204 may use the "Live Preview" functionality of the portable computing device 200 to ensure that the entire label 104 is captured by the successive images 210. The "Live Preview" functionality of the portable computing device 200 is configured to provide a preview of framing/exposure of the camera 202 on the display 212 of the portable computing device 200.

In an aspect, the user 206 may stop the image data capturing functionality of the application 204 when the user 206 determines, by observing the "Live Preview" functionality, that an edge 105 of the label 104 is reached and captured. Alternatively, the application 204 may include feature detection functionality to automatically detect the edge 105 of the label 104 and in response automatically end the image data capturing functionality of the application 204. In an aspect, for example, the application 204 may use a real-time image processing algorithm, such as a Harris edge detection algorithm, to detect the edge 105 of the label 104, and in response automatically end the image data capturing functionality of the application 204. For example, the Harris edge detection algorithm may detect the edge 105 based on detecting no change in the pixel values of an image along the edge direction.

The application 204 may then stitch together selected ones of the successive images 210 to obtain the stitched image 116 of the label 104, extract the label information 118 from the stitched image 116, and use the label information 118 for creating the inspection report 120 of the object 100.

Alternatively and/or additionally, the application 204 may delegate some of the processing of the successive images 210 to another device, such as a remote computing device, a cloud processing device 214, or any other computing device in wired or wireless communication with the portable computing device 200 and including the corresponding functionality described herein. For example, the application 204 may send the successive images 210, the stitched image 116, the label information 118, or the inspection report 120 to such other device. Further details of stitching the successive images 210 together to obtain the stitched image 116 of the label 104, extracting the label information 118 from the stitched image 116, and using the label information 118 to create the inspection report 120 of the object 100 are described below with reference to FIGS. 5-8 below.

Figure 3:
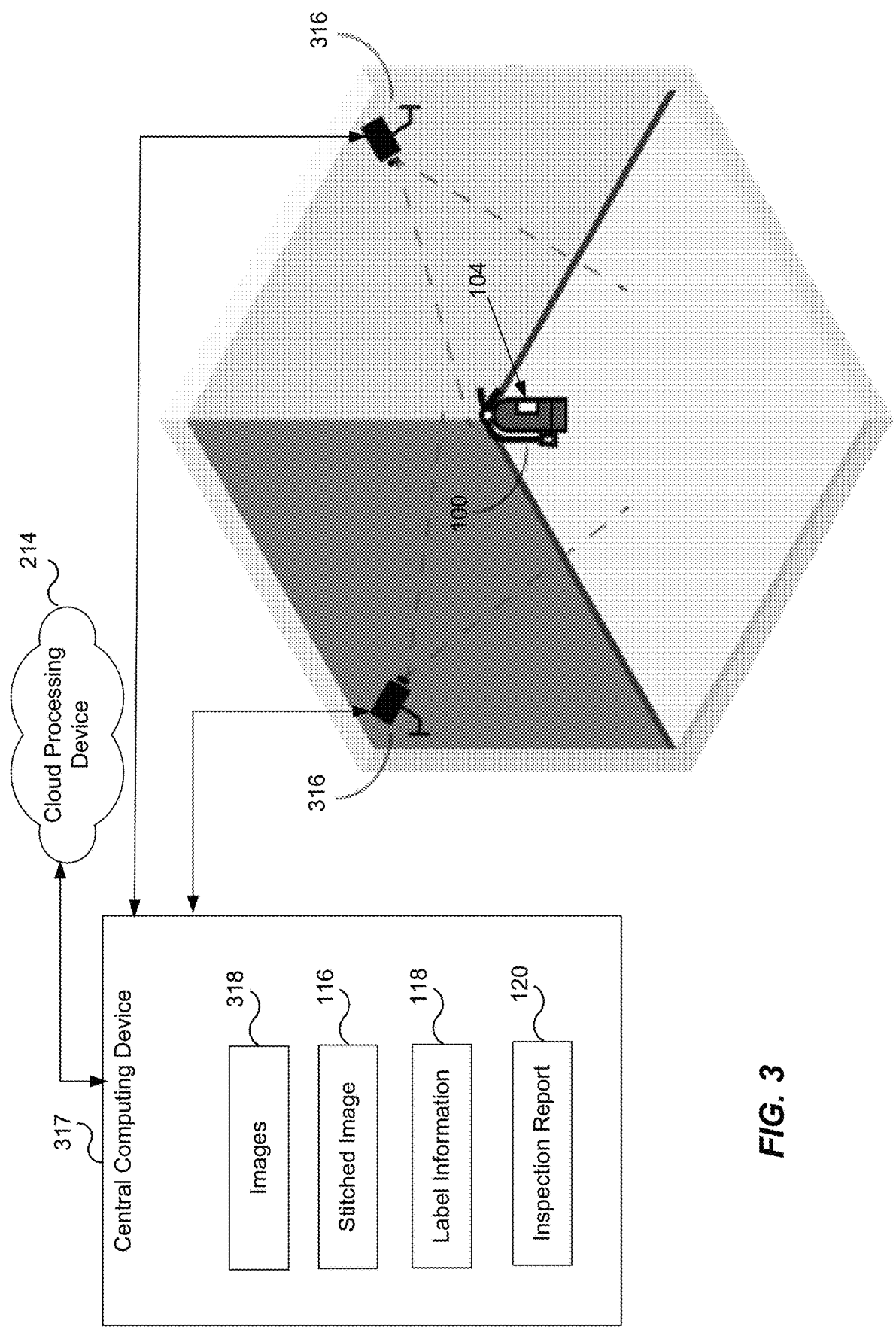
FIG. 3 is a schematic diagram of another example system that implements the example data extraction and inspection report generation functionality of FIG. 1.

Referring to FIG. 3, alternatively and/or additionally, a number of security cameras 316 controlled and/or otherwise in communication with a central computing device 317 may automatically scan or otherwise capture images of the object 100 from different angles and obtain respective images 318 from the different angles. For example, the respective images 318 may be similar or equivalent to the successive images 210 in that they include overlapping sections of an image of the entire label 104. In an aspect, for example, such functionality of the security cameras 316 may be triggered based on a user command received at the central computing device 317. Alternatively and/or additionally, such functionality of the security cameras 316 may be triggered periodically by the central computing device 317 according to an inspection schedule. Upon receiving the images 318 from the security cameras 316, the central computing device 317 may stitch the images 318 together to obtain the stitched image 116 of the label 104, extract/identify the label information 118 from the stitched image 116, and generate the inspection report 120 based on the label information 118. Alternatively and/or additionally, the central computing device 317 may delegate some of the processing of the images 318 to another device such as a remote computing device, a cloud processing device 214, or any other computing device in wired or wireless communication with the central computing device 317 and including the corresponding functionality described herein. For example, the central computing device 317 may send the images 318, the stitched image 116, the label information 118, or the inspection report 120 to such other device.

In an aspect, for example, the security cameras 316 may include an automatic pan-tilt-zoom (PTZ) or other type of adjustable camera that may be controlled, oriented, adjusted, panned, zoomed, etc., to obtain one or more images of the object 100 from a certain perspective and/or angle. In an aspect, the object 100 may be installed/oriented with respect to the position of the security cameras 401 such that the label 104 is at least partially positioned in a respective field of view of each of the security cameras 401. Further details of stitching the images 318 together to obtain the stitched image 116 of the label 104, extracting the label information 118 from the stitched image 116, and using the label information 118 to create the inspection report 120 of the object 100 are described below with reference to FIGS. 5-8 below.

Figure 4:
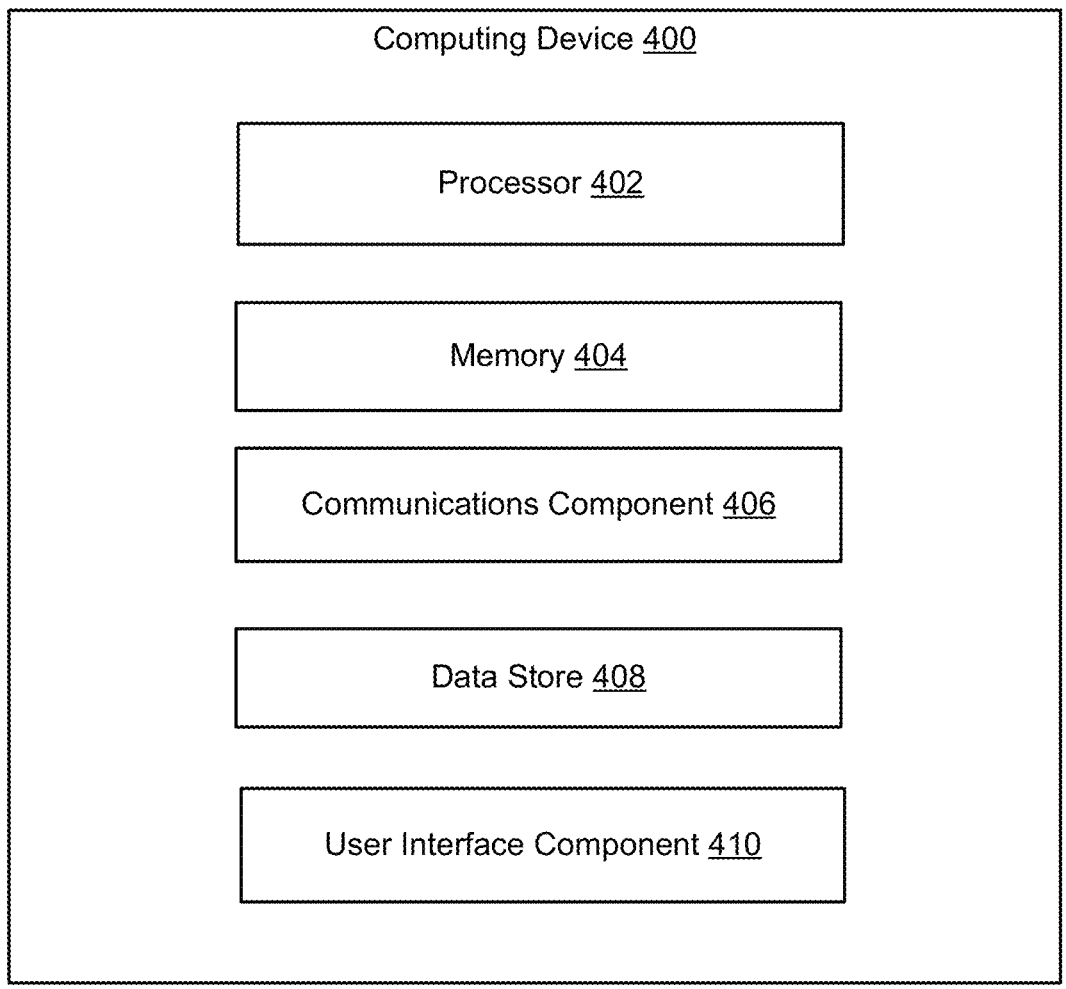
FIG. 4 is a block diagram of an example computing device which may implement the data extraction and inspection report generation functionality of FIG. 1 and/or may implement a component in the example systems of FIG. 2 or 3.

Referring to FIG. 4, a computing device 400 that may implement all or a portion of the functionality described in FIGS. 1-3 above or described in FIGS. 5-8 below includes the functionality described above and/or one or more additional components. For example, the computing device 400 may be or may include at least a portion of the portable computing device 200 or the central computing device 317 or the cameras 316 or the cloud processing device 214 or any other component described herein with reference to FIGS. 1-3 above. The computing device 400 includes a processor 402 which may be configured to execute or implement software, hardware, and/or firmware modules that perform any functionality described herein with reference to FIGS. 1-3 above or with reference to FIGS. 5-8 below. For example, the processor 402 may be configured to execute or implement software, hardware, and/or firmware modules that perform any functionality described herein with reference to the portable computing device 200 or the central computing device 317 or the security cameras 316 or any other component/system/device described herein with reference to FIGS. 1-3.

The processor 402 may be a micro-controller, an application-specific integrated circuit (ASIC), or a field-programmable gate array (FPGA), and/or may include a single or multiple set of processors or multi-core processors. Moreover, the processor 402 may be implemented as an integrated processing system and/or a distributed processing system. The computing device 400 may further include a memory 404, such as for storing local versions of applications being executed by the processor 402, related instructions, parameters, etc. The memory 404 may include a type of memory usable by a computer, such as random access memory (RAM), read only memory (ROM), tapes, magnetic discs, optical discs, volatile memory, non-volatile memory, and any combination thereof. Additionally, the processor 402 and the memory 404 may include and execute an operating system executing on the processor 402, one or more applications, display drivers, etc., and/or other components of the computing device 400.

Further, the computing device 400 may include a communications component 406 that provides for establishing and maintaining communications with one or more other devices, parties, entities, etc. utilizing hardware, software, and services. The communications component 406 may carry communications between components on the computing device 400, as well as between the computing device 400 and external devices, such as devices located across a communications network and/or devices serially or locally connected to the computing device 400. For example, the computing device 400 may implement the central computing device 317 in FIG. 3, in which case the communications component 406 may provide for establishing and maintaining communications with the security cameras 316. Similarly, the computing device 400 may implement the security cameras 316 in FIG. 3, in which case the communications component 406 may provide for establishing and maintaining communications with the central computing device 317.

In an aspect, for example, the communications component 406 may include one or more buses, and may further include transmit chain components and receive chain components associated with a wireless or wired transmitter and receiver, respectively, operable for interfacing with external devices.

Additionally, the computing device 400 may include a data store 408, which can be any suitable combination of hardware and/or software, that provides for mass storage of information, databases, and programs. For example, the data store 408 may be or may include a data repository for applications and/or related parameters not currently being executed by processor 402. In addition, the data store 408 may be a data repository for an operating system, application, display driver, etc., executing on the processor 402, and/or one or more other components of the computing device 400.

The computing device 400 may also include a user interface component 410 operable to receive inputs from a user of the computing device 400 and further operable to generate outputs for presentation to the user (e.g., via a display interface to a display device). For example, in an aspect, the computing device 400 may implement the portable computing device 200 in FIG. 2, in which case, the user interface component 410 may provide the display 212 and the related functionality such as the on-screen start button 208, the "Live Preview" functionality, etc., as described above with reference to FIG. 2.

In an aspect, the user interface component 410 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 410 may include one or more output devices, including but not limited to a display interface, a speaker, a haptic feedback mechanism, a printer, any other mechanism capable of presenting an output to a user, or any combination thereof.

Figure 5:
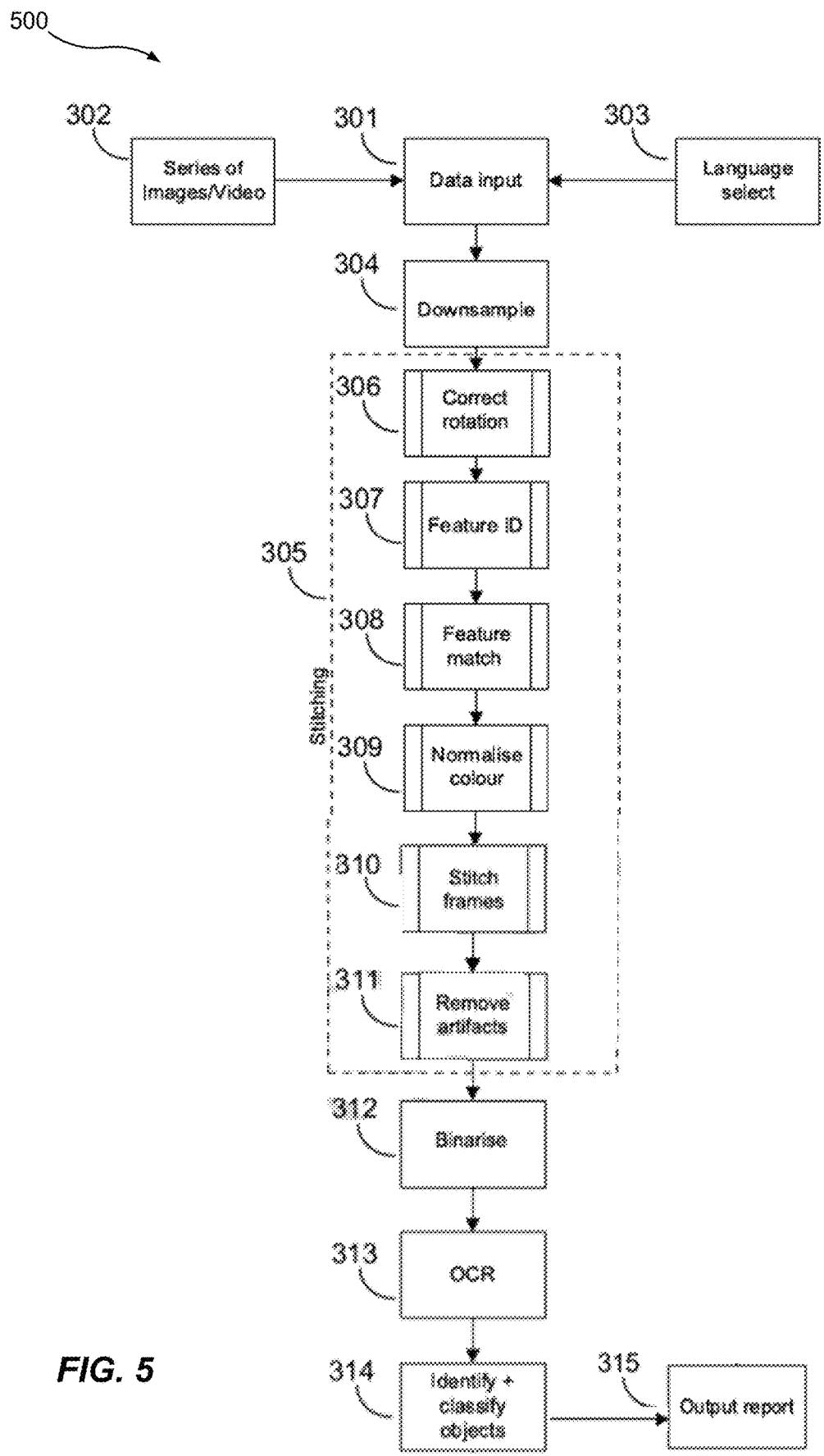
FIG. 5 is a flow diagram of a first example method of data extraction and inspection report generation.

Referring to FIG. 5, an example of an automatic inspection method 500 may be used, for example, by the portable computing device 200 or the central computing device 317 or the cloud processing device 214 to inspect the label 104 on the non-planar surface 102 of the object 100, which may be a cylindrical fire extinguisher, as described herein with reference to FIGS. 1-4 above. In an aspect, for example, the method 500 or at least a portion of the method 500 may be performed by one or more components of the portable computing device 200 in FIG. 2. For example, the method 500 or at least a portion of the method 500 may be performed by the application 204 in the portable computing device 200 when the application 204 is started, as described herein with reference to FIG. 2. Alternatively and/or additionally, the method 500 or at least a portion of the method 500 may be performed by the central computing device 317 as described herein with reference to FIG. 3, or by the computing device 400 as described herein with reference to FIG. 4. As such, in the following, the method 500 is described with reference to various components illustrated in FIGS. 1-4.

At 301, the method 500 may include receiving data input. For example, the data input may include a series of images and/or videos 302 of the object 100, such as the successive images 210 obtained by the camera 202 of the portable computing device 200 (FIG. 2) or the images 318 of the object 100 captured by the security cameras 316 from different angles (FIG. 3). Optionally, the data input may further include a language selection 303 for analyzing textual information in the series of images and/or videos 302 and/or for user interaction and/or for generating the eventual inspection report 120 of the object 100. For example, with reference to FIG. 2, when the user 206 starts the application 204 on the portable computing device 200, the application 204 may request that the user 206 selects a language or may automatically retrieve information of a previously stored indication of the selected language. Alternatively, the language for user interaction and/or for generating the inspection report 120 may be automatically identified by analyzing the processed data, i.e., by analyzing the series of images and/or videos 302 and identifying the language in which the textual information on the label 104 are written.

At 304, optionally, the method 500 may down-sample the captured image/video data to improve the processing speed of the method 500 by reducing the amount of data that is processed. For example, down-sampling may remove unnecessary data. In an aspect, for example, a temporal sampling model may be used to extract a sufficient number of image data. For example, in one non-limiting aspect, the method 500 may select image data at one frame per second from a recorded video. Accordingly, for example, for video data that is captured at 25 frames per second, selecting image data at one frame per second significantly improves the processing time while still maintaining acceptable image sampling of the label 104. In one aspect, for example, the selected image frame may be the frame with a highest clarity and/or the least noise among the other 25 frames. In an alternative and/or additional aspect, for example, the selection of one frame out of 25 frames may include removing redundant/similar frames from the 25 frames and then selecting one frame from the remaining frames. For example, a frame may be removed if the differential pixel value between that frame and a previous frame is less than a certain threshold. Alternatively, a frame may be removed if the differential pixel value between that frame and a previously selected frame is less than a certain threshold, thus indicating that the frame does not add sufficient new information onto the previously selected frame.

In an alternative and/or additional aspect, the down-sampling may be performed to reduce noise in the eventual combined image, i.e., the stitched image 116. For example, combining too many image frames with redundant/overlapping information may result in a noisy combined image. On the other hand, not having enough overlapping information in successive images may also result in poor quality transitions and deformations in the eventual combined image. Therefore, the down-sampling may be performed based on a tradeoff between achieving seamless transitions in the combined image and reducing the noise in the combined image.

In one aspect, for example, the down-sampling criteria may be selected such that after down-sampling, the contents of each pair of subsequent image frames overlap by 15-30% of the width of the images, i.e., the beginning 15-30% of the width of each image frame corresponds to the same captured scene/content as the ending 15-30% of the previous image frame.

After down-sampling, at 305, the method 500 may stitch the selected/remaining image frames together. In an aspect, for example, the stitching may include one or more of blocks 306-311 as described below.

For example, at 306, optionally the image frames may be rotated to ensure correct alignment of the images with respect to one another. For instance, the rotation may be performed using one or more label edges as a guide. In particular, for example, the label 104 of a fire extinguisher may be known to have a rectangular layout, and therefore the image frames may be rotated so that the edges of the label 104 in the images match an aligned rectangular shape.

At 307, feature identification (ID) or detection may be performed on the image frames to identify one or more tracking features such as corners, edges, color changes, distinctive irregularities, etc. For example, techniques such as Harris edge detection may be used to detect an edge based on detecting no change in the pixel values of an image along the edge direction. Alternatively and/or additionally, an edge of the label 104 may be identified based on the color transition on the two sides of the edge, e.g., when a black label is attached to a red body of a fire extinguisher. Alternatively and/or additionally, captured textual information on the label 104 may provide a multitude of edges, corners, and color transitions around the text letters. Such text-related edges, corners, and color transitions may also be recognized with high accuracy and used as tracking features in the image frames. Alternatively and/or additionally, graphical information on the label 104 such as icons, pictographs, colors, etc., may be identified and used as tracking features.

At 308, the tracking features may be matched between subsequent image frames to determine which parts are in common between the subsequent image frames so that the common parts may be later used to combine the image frames together.

After matching features between image frames, at 309, optionally the colors of the image frames may be normalized so that the resulting combined image does not have imbalanced colors or lighting and/or sharp color or lighting transitions or borders. In particular, since the images of the non-planar surface 102 of the object 100 are obtained from different angles, the images may be subject to different lighting conditions and therefore may need to be normalized. The imbalance in the colors/lighting may be even further pronounced if the images are obtained by more than one device, e.g., by the multiple security cameras 316 as in FIG. 3, since the color and/or lighting settings of the multiple security cameras 316 may be different than each other.

In an aspect, the colors of the image frames may be normalized using techniques such as distribution normalization. In an aspect, the color normalization may be performed based on determining an average color/value in an image frame, and comparing the average color/value with a threshold. For example, the average color/value may indicate that an image frame has too much of the color red, in which case the value of the color red may be reduced throughout the image frame. The color normalization may allow for more effective and accurate information extraction later in the process. In particular, by removing imbalanced colors or lighting and/or sharp color or lighting transitions or borders between image frames, the color normalization may allow any subsequently-applied Optical Character Recognition (OCR) algorithm on a resulting combined image to produce more accurate results.

At 310, adjacent image frames may be stitched/combined together based on the matched tracking features, e.g., by aligning/joining/overlapping the detected edges and corners in the image frames. In an aspect, for example, a panorama algorithm may be used to combine the image frames together to obtain a single combined panoramic image that includes the entirety of the label 104. For example, in an aspect, three to five partial images of the label 104 may be stitched together to generate the stitched image 116 that captures the entirety of the label 104. In this case, the down-sampling at 304 may be performed such that a minimum of five image frames are provided to subsequent steps of the method 500.

In some aspects, the stitching may result in artifacts such as visible blurring or deformations. Accordingly, at 311, in some optional implementations, such artifacts may be removed to create a single, aligned, combined image, e.g., the stitched image 116 (FIGS. 1-3). For example, in an aspect, the artifacts may be removed by de-warping (for perspective correction and reversing geometric distortions caused by a lens shape) and/or correcting seams, blurring, ghosting, or other artifacts. For example, in an aspect, ghosting artifacts may be removed by image labeling, including selecting a seam that minimizes the difference between two image frames. In an aspect, image blending may further include gain compensation by giving more weight to the pixels that are near the center of the image frame. Alternatively and/or additionally, image blending may include Laplacian Pyramid blending, which includes applying gain compensation several times on different distances from a seam. Alternatively and/or additionally, image blending may include multi-band blending. Alternatively and/or additionally, image blending may include gradient domain blending by using pixel gradient information instead of pixel colors. In an aspect, artifact removal may alternatively and/or additionally include exposure compensation. For example, for high dynamic range (HDR) imaging, exposure compensation may include creating an average radiance map from multiple image frames and using the average radiance map as a blended result.

In some aspects, the stitching may further include detecting low quality parts in the image frames. For example, in an aspect, the portions of the label 104 that are captured along the sides of the non-planar surface 102 in an image may be curved/distorted and may have low image quality that is unsuitable for subsequent OCR. However, the portions of the label 104 that are captured in a middle section of the non-planar surface 102 in an image may be undistorted and may therefore have good image quality and be suitable for subsequent OCR. Accordingly, the method 500 may detect the curved/distorted sections in each image frame and discard such sections before stitching the image frame to other image frames.

Subsequent to completing the stitching, at 312, a binary image may be optionally created, e.g., by converting the colors of the stitched image 116 into black and white to prepare the stitched image 116 for OCR. Then, at 313 an OCR algorithm is used to extract textual information of the label 104 from the stitched image 116. Also, at 314 other non-textual objects on the label 104, such as icons, images, barcodes, etc., may be extracted from the stitched image 116, for example, by using an object detection algorithm. Alternatively and/or additionally, object detection may be performed based on a priori information about what object types to expect at certain locations in the label 104 and/or along an edge of the label 104 in the stitched image 116. For example, in an aspect, a brand name may be expected along the bottom edge of the label 104, a barcode may be expected along a right edge of the label 104, a logo may be expected in the middle of the label 104 along a top edge, etc. The non-textual objects may be further classified using pattern recognition techniques.

Finally, at 315 the label data/information extracted from the stitched image 116 is automatically added to a site report, optionally including a timestamp indicating when the inspection was performed. In an aspect, for example, the label data/information may be sent to a backend in the cloud to be processed by the cloud processing device 214, or to another computing device, to generate an inspection report of the object 100.

The present aspects are also applicable to reading information imprinted on or attached to a non-planar surface of an indoor or outdoor fixture, such as a column, where the information may not be captured in a single image of the fixture, and multiple images are needed to capture the information in a piecewise manner. The present aspects are further applicable to reading information imprinted on or attached to a planar or non-planar surface where the information does not fit within a single image of the surface and multiple pictures are needed to capture the information in a piecewise manner, for example, due to the large size of the surface or due to field of view limitations of an image capturing device.

Figure 6:
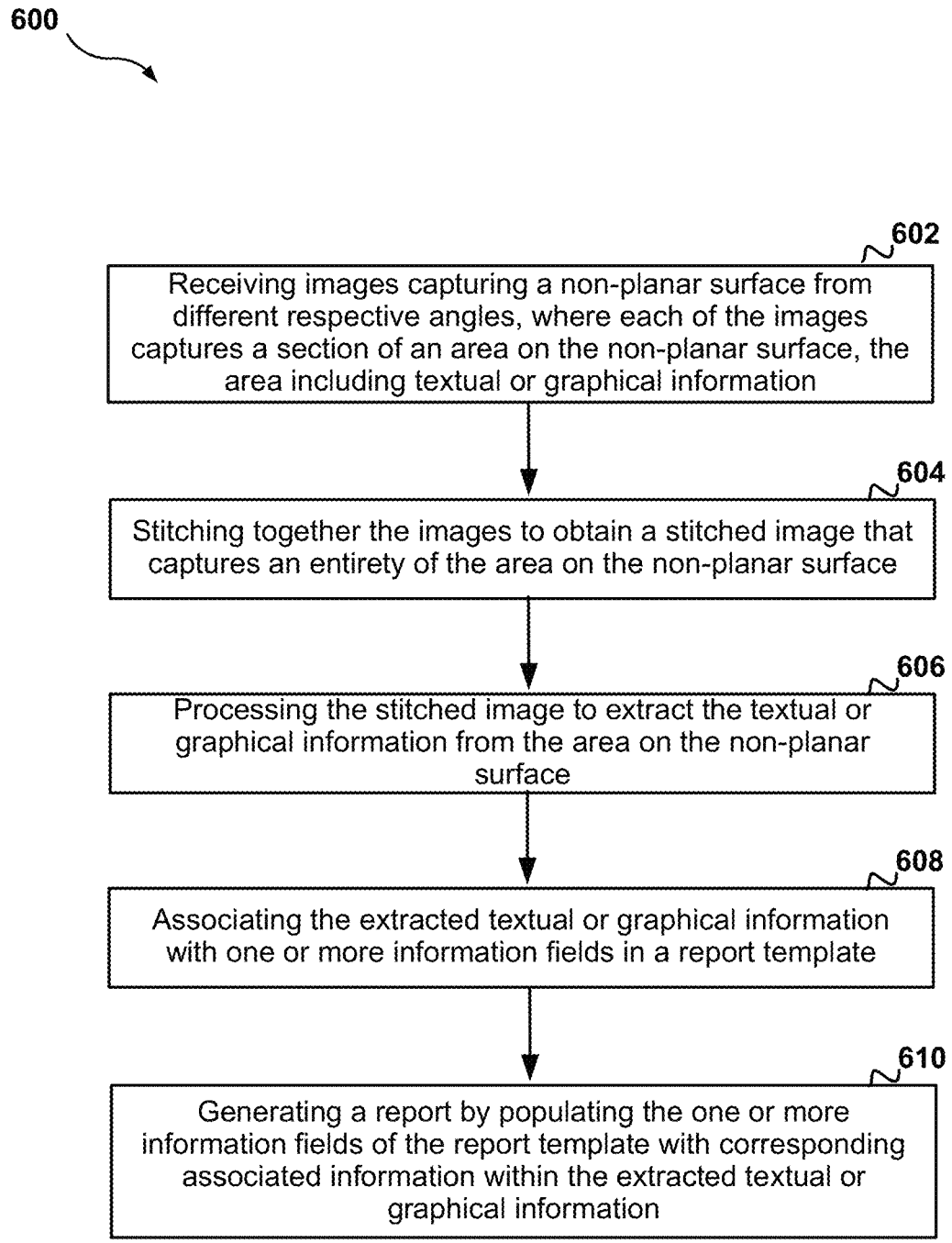
FIG. 6 is a flow diagram of a second example method of data extraction and inspection report generation.

FIG. 6 is a flowchart of a method 600 of operation of the computing device 400 or the portable computing device 200 or the central computing device 317. The method 600 may implement the functionality described herein with reference to FIGS. 1-5, and may be performed by one or more components of the computing device 400 or the portable computing device 200 or the central computing device 317 as described herein with reference to FIGS. 1-5 above.

At 602 the method 600 includes receiving images capturing a non-planar surface from different respective angles, where each of the images captures a section of an area on the non-planar surface, the area including textual or graphical information. For example, in an aspect, the application 204 at the portable computing device 200 may receive the successive images 210, where each of the successive images 210 captures the non-planar surface 102 of the object 100 from different respective angles, and each of the successive images 210 captures a section of an area corresponding to the label 104 on the non-planar surface 102, where the label 104 includes textual or graphical information. In another aspect, for example, the central computing device 317 may receive the images 318 from the security cameras 316, where each of the images 318 captures the non-planar surface 102 of the object 100 from different respective angles, and each of the images 318 captures a section of an area corresponding to the label 104 on the non-planar surface 102, where the label 104 includes textual or graphical information.

At 604 the method 600 may further include stitching together the images to obtain a stitched image that captures an entirety of the area on the non-planar surface. For example, in an aspect, the application 204 may stitch together the successive images 210 to obtain the stitched image 116 that captures an entirety of the area corresponding to the label 104 on the non-planar surface 102 of the object 100. In another aspect, for example, the central computing device 317 may stitch together the images 318 to obtain the stitched image 116 that captures an entirety of the area corresponding to the label 104 on the non-planar surface 102 of the object 100.

At 606 the method 600 may further include processing the stitched image to extract the textual or graphical information from the area on the non-planar surface. For example, in an aspect, the application 104 or the central computing device 317 may process the stitched image 116 to extract the textual or graphical information from the area that corresponds to the label 104 on the non-planar surface 102 of the object 100.

At 608 the method 600 may further include associating the extracted textual or graphical information with one or more information fields in a report template. For example, in an aspect, the application 104 or the central computing device 317 may associate the extracted textual or graphical information, i.e., the label information 118, with one or more information fields 122 in a report template 124.

At 610 the method 600 may further include generating a report by populating the one or more information fields of the report template with corresponding associated information within the extracted textual or graphical information.

For example, in an aspect, the application 104 or the central computing device 317 may generate the inspection report 120 of the object 100 by populating the information fields 122 of the report template 124 with corresponding associated information within the extracted textual or graphical label information 118.

Optionally, the receiving of the images at 602 may further include receiving a sequence of images; and down-sampling the sequence of images to obtain the images. For example, the application 104 may receive a sequence of images, such as a video recording at a 25 frame per second rate, from the camera 202, and down-sample the sequence of images to obtain the successive images 210 at a one frame per second rate. In another aspect, for example, the central computing device 317 may receive a sequence of images, such as a video recording at a 25 frame per second rate, from the security cameras 316, and down-sample the sequence of images to obtain the images 318 at a one frame per second rate.

Optionally, the stitching at 604 may include detecting one or more features in the images; matching the one or more features across at least two adjacent ones of the images; and combining the images by aligning the matched one or more features to obtain the stitched image. For example, referring to FIG. 5, at 307 the stitching may include detecting one or more features in the images 302. Further, at 307 the stitching may include matching the one or more features across at least two adjacent ones of the images 302. Further, at 310 the stitching may include combining the images 302 by aligning the matched one or more features to obtain the stitched image 116.

Optionally, the stitching at 604 may include one or more of correcting rotation mismatches across the images; performing color normalization on the images; or removing artifacts from the stitched image. For example, referring to FIG. 5, at 306 the stitching may include correcting rotation mismatches across the images 302. Alternatively and/or additionally, at 309 the stitching may include performing color normalization on the images 302. Alternatively and/or additionally, at 311 the stitching may include removing artifacts from the stitched image 116.

Optionally, the stitching at 604 may include identifying low image quality sections corresponding to curved edges of the non-planar surface in each of the images; and cropping each of the images to remove the identified low image quality sections. For example, referring to FIG. 5, at 310 the stitching may include identifying low image quality sections corresponding to curved edges of the non-planar surface 102 in each of the images 302; and cropping each of the images 302 to remove the identified low image quality sections.

Optionally, the processing of the stitched image at 606 to extract the textual or graphical information may include binarizing the stitched image to obtain a black and white stitched image; and performing OCR on the black and white stitched image to extract textual information from the area on the non-planar surface. For example, referring to FIG. 5, at 312 the stitched image 116 may be binarized to obtain a black and white stitched image 116; and at 313 OCR may be performed on the black and white stitched image 116 to extract textual information from the area corresponding to the label 104 on the non-planar surface 102 of the object 100.

Optionally, the processing of the stitched image at 606 to extract the textual or graphical information may include performing object recognition or pattern recognition on the stitched image to extract graphical information from the area on the non-planar surface. For example, referring to FIG. 5, at 314 object recognition or patent recognition may be performed on the stitched image 116 to extract graphical or any other non-textual information from the area corresponding to the label 104 on the non-planar surface 102 of the object 100.

Optionally, the non-planar surface 102 may include a curved surface of a cylindrical vessel, the area may correspond to a rectangular label 104 attached on the curved surface of the cylindrical vessel, and the report may include an inspection report 120 of the cylindrical vessel.

Optionally, the receiving of the images 210 at 602 may include obtaining the images 210 by the camera 202 of the portable computing device 200 via the application 204 executed on the portable computing device 200.

Optionally, the method 600 may further include determining to start the application 104 based on a user input received through a user interface of the portable computing device 200, e.g., the user 206 pressing the on-screen start button 208.

Optionally, the obtaining of the images 210 may include obtaining the images 210 by the application 204 via accessing the camera 202 in the portable computing device 200.

Optionally, the method 600 may further include determining to stop the application 204 based on detecting an edge 105 of the area associated with the label 104 on the non-planar surface 102 of the object 100.

Optionally, receiving of the images 318 may include obtaining the images 318 by the security cameras 316 installed in an area where the object 100 with the non-planar surface 102 is located.

Optionally, the method 600 may further include adjusting a position of at least one of the security cameras 316 to achieve a field of view that includes the non-planar surface 102 of the object 100.

Optionally, the method 600 may further include obtaining a first image by one of the security cameras 316; changing a setting of the one of the security cameras 316; and obtaining a second image by the one of the security cameras 316, where the first image and the second image include different sections of the area corresponding to the label 104 on the non-planar surface 102 of the object 100.

Optionally, the method 600 may further include determining a trigger to obtain the images 318; and initiating the security cameras 316 to obtain the images 318 in response to the trigger.

Optionally, the trigger may include a periodic inspection schedule or a user input received via a user interface of the central computing device 317 that is in communication with the security cameras 316.

Figure 7:
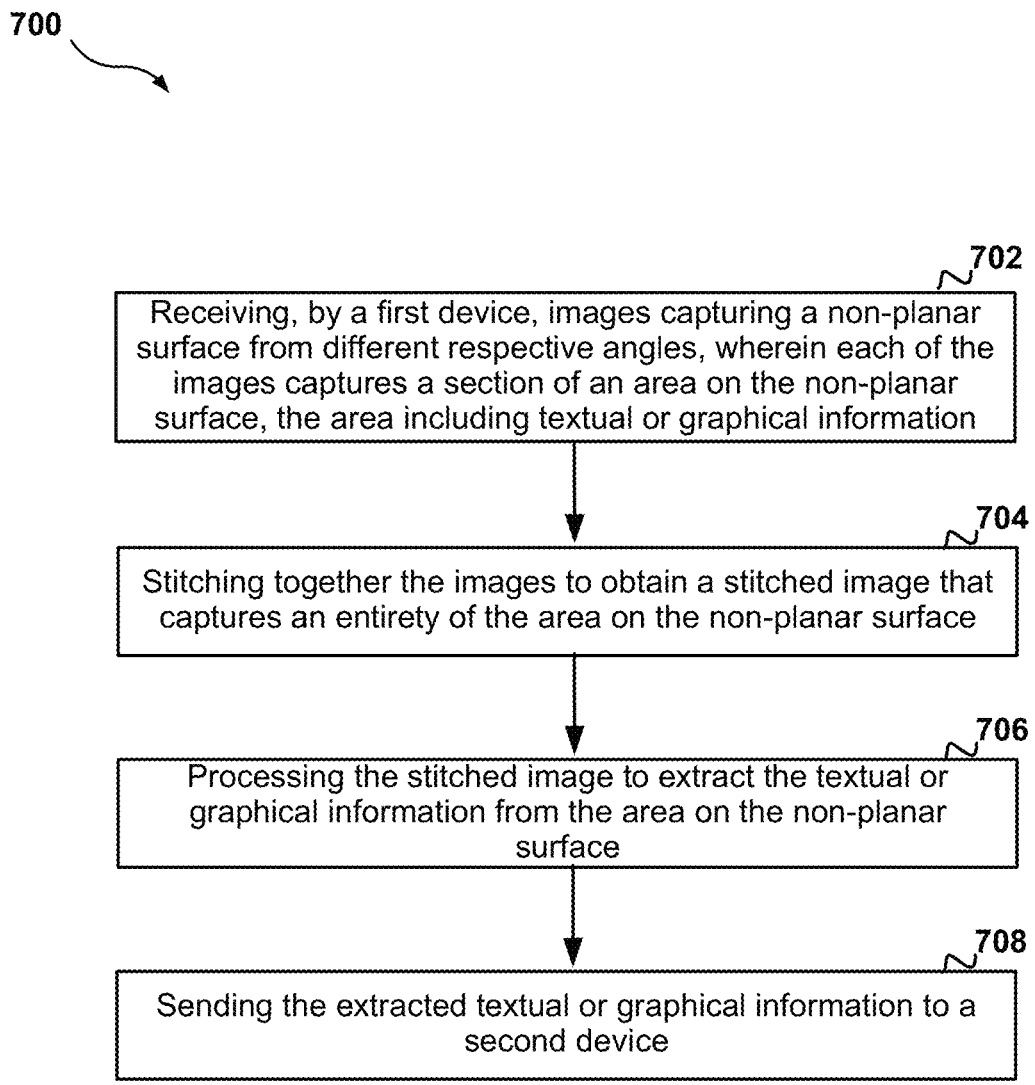
FIG. 7 is a flow diagram of a third example method of data extraction and inspection report generation.

FIG. 7 is a flowchart of a method 700 of operation of the computing device 400 or the portable computing device 200 or the central computing device 317. The method 700 may implement the functionality described herein with reference to FIGS. 1-5, and may be performed by one or more components of the computing device 400 or the portable computing device 200 or the central computing device 317 as described herein with reference to FIGS. 1-5 above.

At 702 the method 700 includes receiving, by a first device, images capturing a non-planar surface from different respective angles, where each of the images captures a section of an area on the non-planar surface, the area including textual or graphical information. For example, in an aspect, the application 204 at the portable computing device 200 may receive the successive images 210, where each of the successive images 210 captures the non-planar surface 102 of the object 100 from different respective angles, and each of the successive images 210 captures a section of an area corresponding to the label 104 on the non-planar surface 102, where the label 104 includes textual or graphical information. In another aspect, for example, the central computing device 317 may receive the images 318 from the security cameras 316, where each of the images 318 captures the non-planar surface 102 of the object 100 from different respective angles, and each of the images 318 captures a section of an area corresponding to the label 104 on the non-planar surface 102, where the label 104 includes textual or graphical information.

At 704 the method 700 includes stitching together the images to obtain a stitched image that captures an entirety of the area on the non-planar surface. For example, in an aspect, the application 204 may stitch together the successive images 210 to obtain the stitched image 116 that captures an entirety of the area corresponding to the label 104 on the non-planar surface 102 of the object 100. In another aspect, for example, the central computing device 317 may stitch together the images 318 to obtain the stitched image 116 that captures an entirety of the area corresponding to the label 104 on the non-planar surface 102 of the object 100.

At 706 the method 700 includes processing the stitched image to extract the textual or graphical information from the area on the non-planar surface. For example, in an aspect, the application 104 or the central computing device 317 may process the stitched image 116 to extract the textual or graphical information from the area that corresponds to the label 104 on the non-planar surface 102 of the object 100.

At 708 the method 700 may include sending the extracted textual or graphical information to a second device. For example, in an aspect, the application 104 or the central computing device 317 may send the extracted textual or graphical information to the cloud processing device 214, for example, for further processing and for the generation of the inspection report 120 of the object 100.

Optionally, the second device may include the cloud processing device 214 or any other computing device.

Figure 8:
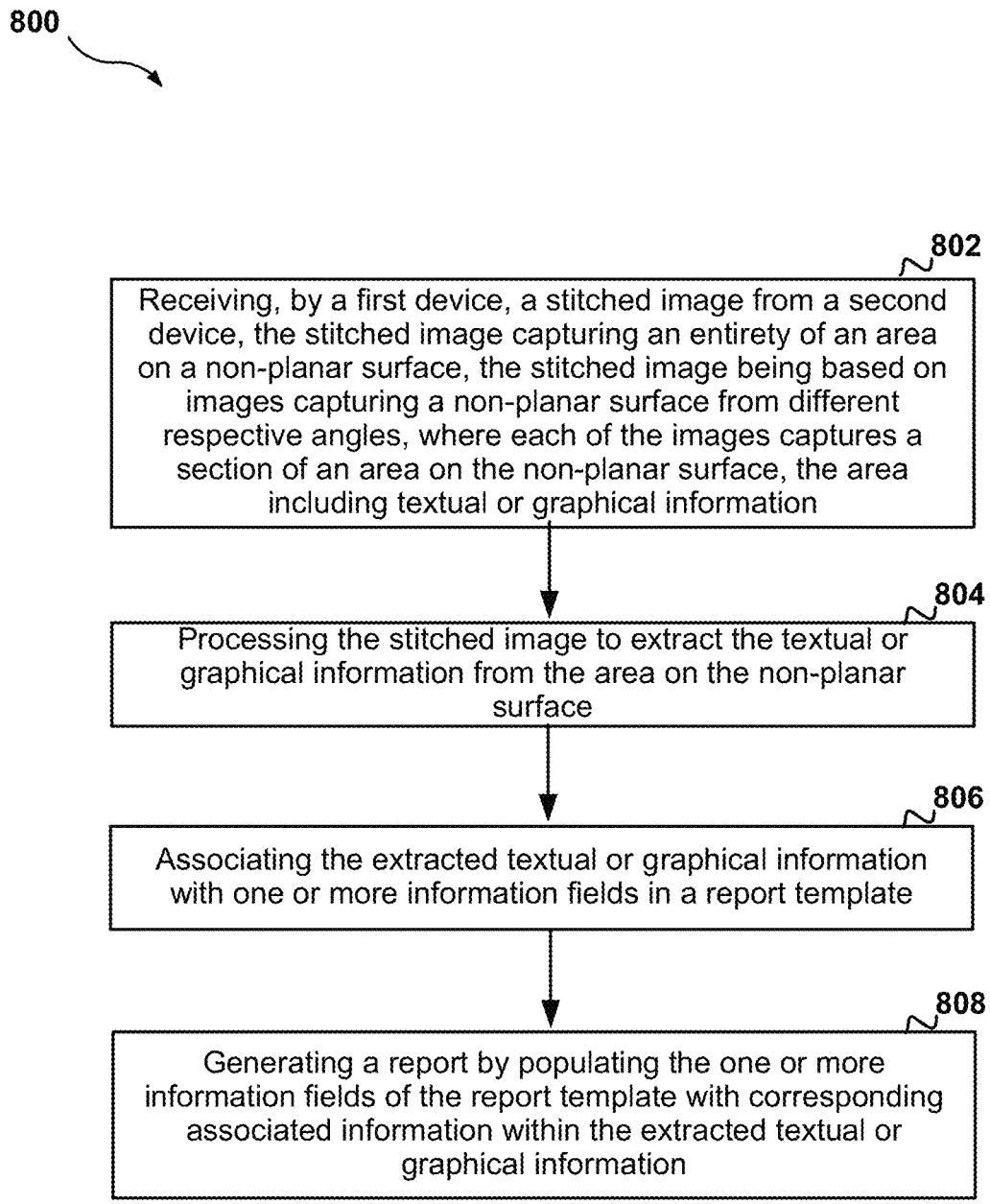
FIG. 8 is a flow diagram of a fourth example method of data extraction and inspection report generation.

FIG. 8 is a flowchart of a method 800 of operation of the computing device 400 or the portable computing device 200 or the central computing device 317. The method 800 may implement the functionality described herein with reference to FIGS. 1-5, and may be performed by one or more components of the computing device 400 or the portable computing device 200 or the central computing device 317 as described herein with reference to FIGS. 1-5 above.

At 802 the method 800 includes receiving, by a first device, a stitched image from a second device, the stitched image capturing an entirety of an area on a non-planar surface, the stitched image being based on images capturing a non-planar surface from different respective angles, where each of the images captures a section of an area on the non-planar surface, the area including textual or graphical information. For example, in an aspect, the cloud processing device 214 may receive the stitched image 116 from the application 204 on the portable computing device 200 or from the central computing device 317, where the stitched image 116 captured an entirety of an area corresponding to the label 104 on the non-planar surface 102 of the object 100, the stitched image 116 being based on images 210 or 318 capturing the non-planar surface 102 from different respective angles, where each of the images 210 or 318 captures a section of an area corresponding to the label 104 on the non-planar surface 102 of the object 100, the area including textual or graphical information.

At 804 the method 800 may include processing the stitched image to extract textual or graphical information from the area on the non-planar surface. For example, in an aspect, the cloud processing device 214 may process the stitched image 116 to extract textual or graphical information from the area that corresponds to the label 104 on the non-planar surface 102 of the object 100.

At 806 the method 800 includes associating the extracted textual or graphical information with one or more information fields in a report template. For example, in an aspect, the cloud processing device 214 may associate the extracted textual or graphical information, i.e., the label information 118, with one or more information fields 122 in a report template 124.

At 808 the method 800 may include generating a report by populating the one or more information fields of the report template with corresponding associated information within the extracted textual or graphical information. For example, in an aspect, the cloud processing device 214 may generate the inspection report 120 of the object 100 by populating the information fields 122 of the report template 124 with corresponding associated information within the extracted textual or graphical information 118.

Optionally, the first device may include the cloud processing device 214 or any other computing device, and the second device may include the portable computing device 200 or the central computing device 317.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of extracting data from an image, comprising:
   receiving images that capture a non-planar surface from different respective angles, wherein each of the images captures a section of an area on the non-planar surface, the area including textual or graphical information;
   identifying low image quality sections corresponding to curved edges of the non-planar surface in the images;
   cropping the images to remove the low image quality sections;
   stitching together the images to obtain a stitched image that captures an entirety of the area on the non-planar surface;
   processing the stitched image to extract the textual or graphical information from the area on the non-planar surface;
   associating the textual or graphical information with one or more information fields in a report template; and
   generating a report by populating the one or more information fields of the report template with corresponding associated information within the textual or graphical information.

2. The method of claim 1, further comprising:
   wherein receiving of the images includes receiving a sequence of images; and
   down-sampling the sequence of images to obtain the images.

3. The method of claim 1, wherein the stitching comprises:
   detecting one or more features in the images;
   matching the one or more features across at least two adjacent ones of the images; and
   combining the images by aligning the one or more features to obtain the stitched image.

4. The method of claim 1, wherein the stitching comprises one or more of:
   correcting rotation mismatches across the images;
   performing color normalization on the images; or
   removing artifacts from the stitched image.

5. The method of claim 1, wherein the processing of the stitched image to extract the textual or graphical information comprises:
   binarizing the stitched image to obtain a black and white stitched image; and
   performing optical character recognition "OCR" on the black and white stitched image to extract textual information from the area on the non-planar surface.

6. The method of claim 1, wherein the processing of the stitched image to extract the textual or graphical information comprises:
   performing object recognition or pattern recognition on the stitched image to extract graphical information from the area on the non-planar surface.

7. The method of claim 1, wherein the non-planar surface comprises a curved surface of a cylindrical vessel, wherein the area corresponds to a rectangular label attached on the curved surface of the cylindrical vessel, wherein the report comprises an inspection report of the cylindrical vessel.

8. The method of claim 1, wherein the receiving of the images further comprises obtaining by a camera of a portable computing device via an application executed on the portable computing device.

9. The method of claim 8, further comprising:
   determining to start the application based on a user input received through a user interface of the portable computing device; and wherein the obtaining of the images further comprises obtaining by the application via accessing the camera in the portable computing device.

10. The method of claim 9, further comprising:
determining to stop the application based on detecting an edge of the area on the non-planar surface.

11. The method of claim 1, wherein the receiving of the images further comprises obtaining by security cameras installed in a corresponding area where an object comprising the non-planar surface is located.

12. The method of claim 11, further comprising:
adjusting a position of at least one of the security cameras to achieve a field of view that includes the non-planar surface.

13. The method of claim 11, further comprising:
obtaining a first image by one of the security cameras;
changing a setting of the one of the security cameras; and
obtaining a second image by the one of the security cameras, wherein the first image and the second image comprise different sections of the area on the non-planar surface.

14. The method of claim 11, further comprising:
determining a trigger to obtain the images; and
initiating the security cameras to obtain the images in response to the trigger.

15. The method of claim 14, wherein the trigger comprises a periodic inspection schedule or a user input received via a user interface of a central computing device in communication with the security cameras.

16. An apparatus comprising:
a processor; and
a memory storing instructions that when executed by the processor cause the processor to:
receive images capturing a non-planar surface from different respective angles, wherein each of the images captures a section of an area on the non-planar surface, the area including textual or graphical information;
identify low image quality sections corresponding to curved edges of the non-planar surface in each of the images;
crop each of the images to remove the low image quality sections;
stitch together the images to obtain a stitched image that captures an entirety of the area on the non-planar surface;
process the stitched image to extract the textual or graphical information from the area on the non-planar surface;
associate the textual or graphical information with one or more information fields in a report template; and
generate a report by populating the one or more information fields of the report template with corresponding associated information within the textual or graphical information.

17. A method of extracting data from an image, comprising:
receiving images that capture a non-planar surface from different respective angles, wherein each of the images captures a section of an area on the non-planar surface, the area including textual or graphical information;
identifying low image quality sections corresponding to curved edges of the non-planar surface in each of the images;
cropping each of the images to remove the low image quality sections;
stitching together the images to obtain a stitched image that captures an entirety of the area on the non-planar surface;
processing the stitched image to extract the textual or graphical information from the area on the non-planar surface; and
sending the textual or graphical information to a second device.

18. The method of claim 17, wherein the second device comprises a cloud processing device or a central computing device.

19. A first device comprising:
a processor; and
a memory storing instructions that when executed by the processor cause the processor to:
receive images that capture a non-planar surface from different respective angles, wherein each of the images captures a section of an area on the non-planar surface, the area including textual or graphical information;
identify low image quality sections corresponding to curved edges of the non-planar surface in each of the images;
crop each of the images to remove the low image quality sections;
stitch together the images to obtain a stitched image that captures an entirety of the area on the non-planar surface;
process the stitched image to extract the textual or graphical information from the area on the non-planar surface; and
send the textual or graphical information to a second device.

20. A method of extracting data from an image, comprising:
receiving, by a first device, a stitched image from a second device, the stitched image capturing an entirety of an area on a non-planar surface, the stitched image being based on cropped images obtained by cropping images that capture the non-planar surface from different respective angles, wherein each of the images captures a section of the area on the non-planar surface, the area including textual or graphical information, wherein cropping the images crops low image quality sections corresponding to curved edges of the non-planar surface in each of the images;
processing the stitched image to extract the textual or graphical information from the area on the non-planar surface;
associating the textual or graphical information with one or more information fields in a report template; and
generating a report by populating the one or more information fields of the report template with corresponding associated information within the textual or graphical information.

21. The method of claim 20, wherein the first device comprises a cloud processing device or a central computing device, wherein the second device comprises a portable computing device.

22. A first device comprising:
a processor; and
a memory storing instructions that when executed by the processor cause the processor to:
receive a stitched image from a second device, the stitched image capturing an entirety of an area on a non-planar surface, the stitched image being based on cropped images obtained by cropping images that capture the non-planar surface from different respective angles, wherein each of the images captures a section of the area on the non-planar surface, the area including textual or graphical information, wherein cropping the images crops low image quality sections corresponding to curved edges of the non-planar surface in each of the images;

process the stitched image to extract the textual or graphical information from the area on the non-planar surface;

associate the textual or graphical information with one or more information fields in a report template; and generate a report by populating the one or more information fields of the report template with corresponding associated information within the textual or graphical information.

\* \* \* \* \*

UNITED STATES PATENT AND TRADEMARK OFFICE
CERTIFICATE OF CORRECTION

PATENT NO. : 10,970,578 B2  
APPLICATION NO. : 16/270432  
DATED : April 6, 2021  
INVENTOR(S) : Liam Moore et al.

Page 1 of 1

It is certified that error appears in the above-identified patent and that said Letters Patent is hereby corrected as shown below:

In the Specification

In Column 8, Line 11, delete "cameras 316" and insert -- security cameras 316 --, therefor.

In Column 13, Line 52, delete "application 104" and insert -- application 204 --, therefor.

In Column 13, Line 60, delete "application 104" and insert -- application 204 --, therefor.

In Column 14, Line 1, delete "application 104" and insert -- application 204 --, therefor.

In Column 14, Line 10, delete "application 104" and insert -- application 204 --, therefor.

In Column 15, Line 16, delete "application 104" and insert -- application 204 --, therefor.

In Column 16, Line 27, delete "application 104" and insert -- application 204 --, therefor.

In Column 16, Line 34, delete "application 104" and insert -- application 204 --, therefor.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*